C. S. BANGHART.
FENDER.
APPLICATION FILED AUG. 27, 1914.
1,136,642.
Patented Apr. 20, 1915.
2 SHEETS—SHEET 2.
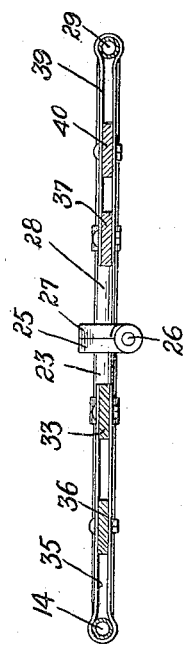
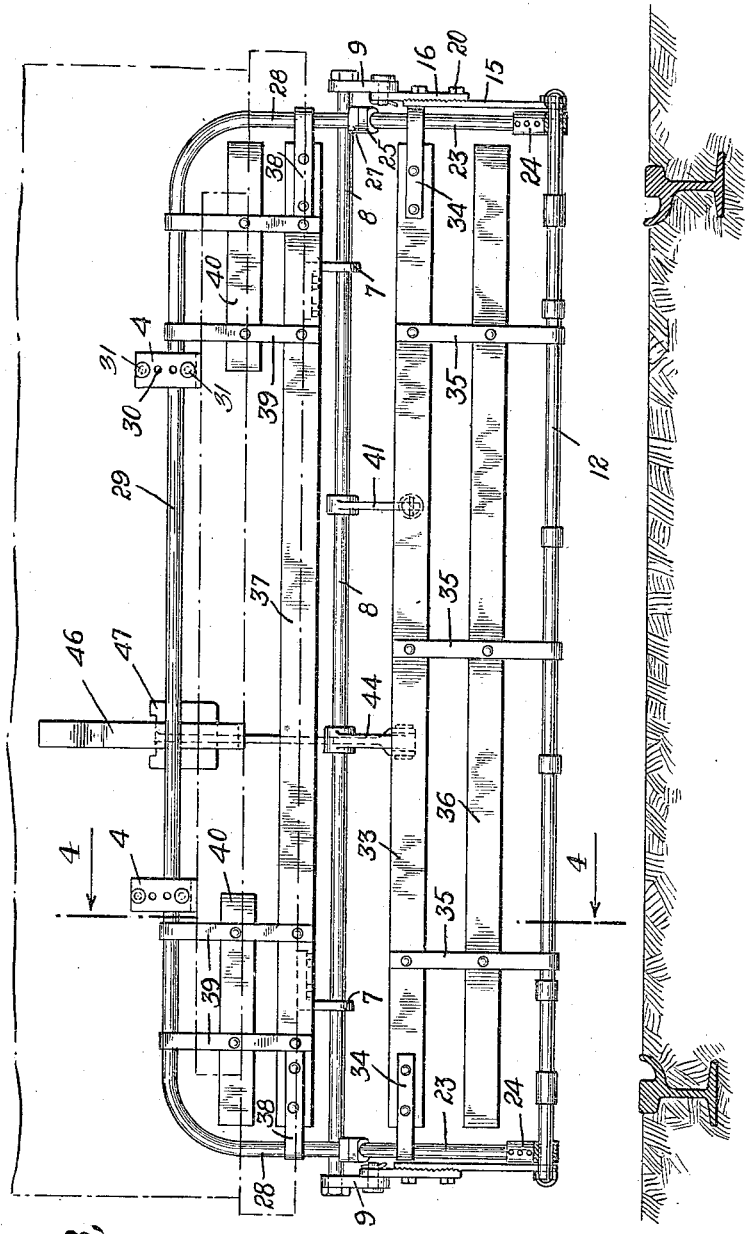
WITNESSES
Dyer Smith
Frank Graham
INVENTOR
Charles S. Banghart.
BY
J. T. Edmonds
ATTORNEY

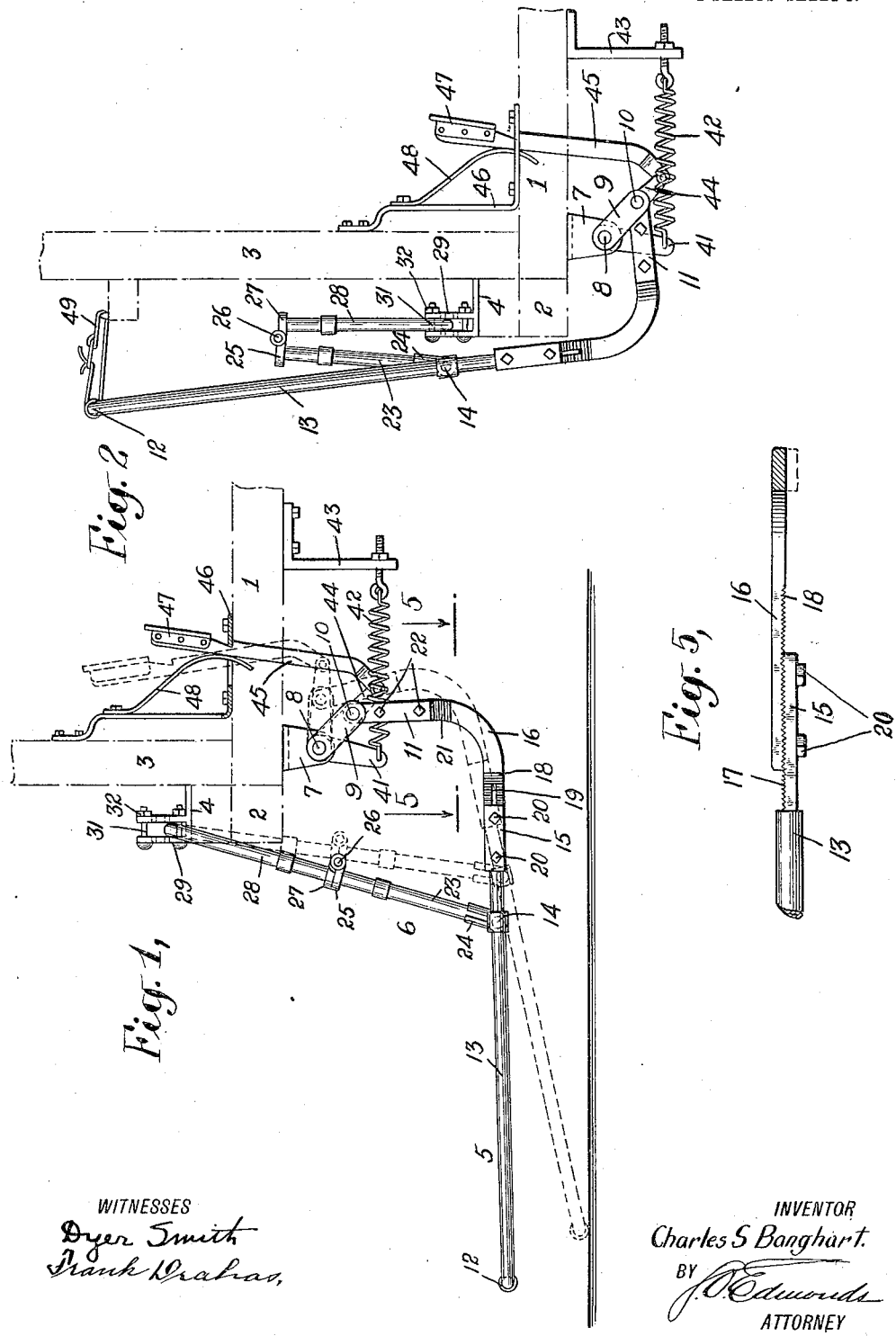

UNITED STATES PATENT OFFICE.

CHARLES S. BANGHART, OF FLUSHING, NEW YORK, ASSIGNOR TO N-W EQUIPMENT CO., INC., OF NEW YORK, N. Y., A CORPORATION OF NEW YORK.

FENDER.

1,136,642. Specification of Letters Patent. Patented Apr. 20, 1915.

Application filed August 27, 1914. Serial No. 858,815.

*To all whom it may concern:*

Be it known that I, CHARLES S. BANGHART, a citizen of the United States, residing at Flushing, in the county of Queens and State of New York, have invented certain new and useful Improvements in Fenders, of which the following is a specification.

My invention relates to car fenders adapted to be attached to the front end of a car and to be folded up out of the way when not in use.

My invention is particularly directed to improvements in the type of car fender in which the fender is pivotally connected at the rear of the same to the under side of the car, the fender comprising a horizontal or forwardly extending portion which in the normal operation of the car is carried with the forward edge of the same a short distance above the roadbed. There is also provided an apron or part extending approximately vertically which is connected to the car at its upper end and to the horizontal portion of the fender at its lower end at a point forward of the rear pivotal support of the horizontal portion of the fender, the apron thus supporting the horizontal portion. With such a construction, means may be provided whereby the motorman of the car may manipulate the fender, when occasion arises, to swing the horizontal portion of the fender about the pivotal support provided by the connection of the apron therewith, to quickly depress the forward edge of the fender. This may well be accomplished by providing the motorman with a pedal device so connected that upon operation of the same, the rear end of the fender is quickly raised and the forward edge of the fender is depressed into contact with the tracks or road-bed.

The object of my invention is to improve the construction of car fenders such as those referred to so that an improved arrangement may be provided whereby the fender may be folded up out of the way when not in use, and so that a fender may readily be adjusted into any desired operative position in connection with its installation on cars of different types and so that other improved results may be attained.

A construction has heretofore been proposed in which the apron is provided at its lower end with a number of loops through which the horizontal portions of the fender extend, the horizontal portion thus being supported with a slidable engagement by the apron. With such a construction, the fender is folded up out of the way when this is desired by raising the forward edge of the fender and sliding the horizontal members through the loops referred to until the horizontal portion and the apron are in an approximately vertical position in front of the car, in which they may then be temporarily supported. My invention comprises an improvement upon constructions of this character in that the apron is not slidably connected to the horizontal portion of the fender, but is connected thereto by a fixed pivot, the apron being provided with a hinged joint intermediate its upper and lower ends. With this form of construction, the fender is raised to inoperative position by simply raising the forward edge of the horizontal portion of the fender, the hinged joint of the apron opening as the fender is raised, so that when the horizontal portion of the fender is in an approximately vertical position, the two hinged members of the apron are folded into approximate parallel relation with each other. This construction is superior to the sliding type of connection referred to for the reason chiefly that the fender is more easily adjusted from its operative into its inoperative position by a simple lifting of the forward edge of the fender without the necessity of paying any attention to the connection between the apron and the horizontal member, whereas with the sliding type of connection referred to, the horizontal member is very apt to stick in the loops of the apron through which it is moved when being adjusted to inoperative position. By my invention also various adjustable means are provided whereby the height and relative position of the fender may be adjusted when an installation is made on any one of various types of cars which have proportions and dimensions differing quite considerably among themselves.

In order that my invention may be more clearly understood, attention is hereby directed to the accompanying drawings forming part of this application and illustrating certain embodiments of my invention.

In the drawings, Figure 1 represents an end view of the fender, Fig. 2 is a similar view showing the fender raised to an inoperative position, Fig. 3 is a front view of the fender in operative position with the sleeve portions of the members 28 shown in section, Fig. 4 is a vertical section on line 4—4 of Fig. 3, and Fig. 5 is an enlarged horizontal section taken on line 5—5 of Fig. 1.

Referring to the drawings, the car 1 is provided with the bumper 2 and the dash 3 to which is secured the bracket 4. The fender comprises a forwardly extending, or as I term it, a horizontal portion which I indicate generally by reference character 5, and the apron 6 pivoted to the horizontal portion 5 and pivotally secured at its upper end to the bracket 4. In the construction illustrated, brackets 7 are employed, depending from the under side of platform 1 of the car and supporting a horizontal rock shaft 8. On the shaft are two cranks 9 to the ends of which are pivotally connected at 10 the rear ends of members 11 which are adjustably connected to the side members of the horizontal portion of the fender. The horizontal portion 5 of the fender may be of any suitable construction. As here shown, the horizontal portion 5 comprises a front edge member 12, two side members 13, and a rear member 14 parallel to the front member 12, preferably formed of pipe, the front and side members preferably being formed from a single length of pipe bent to shape and the rear transverse member 14 secured thereto. Suitable slats or other transverse members (not shown) may be extended between the side members 13. The rear ends of the side arms 13 extend a short distance to the rear of the cross-member 14 and have secured thereto or formed integral therewith rearwardly directed extensions 15 which are adjustably connected to members 16 extending rearwardly from their connection with members 15, members 16 being bent upwardly to an adjustable connection with members 11 which, as stated, are pivotally connected at 10 to the cranks 11. The adjustable connection between members 15 and 16 is such as to provide for lengthening or shortening the horizontal portion 5 of the fender, and the adjustable connection between members 16 and 11 is such as to provide for the raising or lowering of the rear edge of the fender, both of these adjustments being necessary or desirable in connection with the installation of a fender upon any one of a number of types of cars as stated above. The connection which I prefer to employ between members 15 and 16 consists in providing the coacting surfaces of members 15 and 16 with serrated or laterally ridged portions 17 and 18 as illustrated, one of the members as 16 being provided with a longitudinal slot 19 therethrough. Bolts 20 are provided extending through member 15 and through the slot 19 in member 16. When the adjustment of member 15 relative to member 16 has been made in mounting the fender, the nuts on bolts 20 are tightened so that the serrated surfaces of the two members come into close contact, thereby locking members 15 and 16 together. Preferably also the same construction is used to connect members 11 and 16 which may be provided with lateral coacting serrations, such as 21, and one of the members being provided with a longitudinal slot through which bolts 22 pass in securing the members together.

The apron 6, as stated, comprises upper and lower members which are hinged together. The lower element of the apron comprises a pair of side arms 23 preferably formed of pipe and having pivotal connection at their lower ends with the transverse rear member 14 of the horizontal portion 5 of the fender, this connection preferably being made by securing connections 24 to the lower ends of members 23, members 24 being provided at their lower ends with horizontal sleeve portions extending around the member 14 and bearing thereon to form the pivotal connection. Members 23 are provided at their upper ends with flanges 25 which are pivoted on pins 26 to flanges 27 on members 28 which constitute the vertical side portions of the upper element of the hinged apron. Members 28 are preferably formed of pipe and are integral with or secured to the top horizontal member 29 of the apron, members 28 and 29 preferably being formed of one length of pipe bent to the proper shape. Member 29 is pivotally supported by brackets 4 from the front of the car. Preferably provision is made for supporting member 29 at a greater or less height above the road-bed so that the fender may be adjusted more readily when mounted upon different cars. The arrangement illustrated for securing this adjustable mounting of the upper end of the apron consists in providing a number of horizontal openings 30 through the vertical flanges of brackets 4, these holes being arranged at different distances from the road-bed. Pins or bolts 31 may be inserted through the desired holes 30 and secured in position as by nuts 32 on bolts 31, member 29 being supported upon bolts 31.

It should be noted that when the fender is in operative position, members 23 and 28 of the apron are in the same straight line extending forwardly from their upper ends at a small angle to the vertical, flanges 25 and 27 contacting each other. The hinge joint thus opens outwardly when the forward edge of the fender is raised, but the joint cannot open in the other direction, the apron thus forming a steady support for the fender. Various transverse members may be secured to the side arms 23 and 28 respectively of the apron, the apron thus serving to prevent any objects picked up by the horizontal portion of the fender passing underneath the car. In the drawing I have shown a slat 33 connected to the side members 23 by means of straps 34 which are provided with loops encircling side members 23, slat 33 also being connected to the front member 12 of the fender by straps 35 provided with loops encircling member 12. In the drawing I have also shown a slat 36 carried by strips 35. I have also illustrated a slat 37 connected to the side arms 28 by means of straps 38 having loops encircling members 28, slat 37 also being connected to member 29 by straps 39 similar to straps 35, slats 40 being carried by straps 39. The above described arrangement is, of course, merely given for purposes of illustration and my invention is not limited to the particular construction described.

In the construction illustrated, the rock shaft 8 has one or more cranks 41 thereon to each of which one end of a spring 42 is connected, the other end of the spring being secured to a suitable support 43 mounted on the under side of the car platform. The rock shaft also has a crank 44 secured thereto to the end of which is pivotally connected the lower end of the member 45 which constitutes a latch and restoring device whereby the forward edge of the fender may be depressed against the roadbed as shown in dotted lines in Fig. 1, or restored to the normal position shown in full lines in Fig. 1. This member 45 extends upwardly through an opening in a metallic plate 46 mounted on the upper surface of the car platform 1 and at its upper end it carries a vertically disposed plate 47. The member 45 has a notch cut therein, the lower wall of which is horizontally disposed, while the upper wall is inclined. A spring 48 is mounted on the dash 3 of the car and presses against member 45 in a direction to carry the notched edge of the member into coaction with the plate 46. When the motorman wishes to depress the fender, he operates foot-pedal 47 releasing the shoulder on arm 45 from plate 46 so that spring 42 operates to raise the rear end of the fender and depress the forward end. When the motorman wishes to restore the fender to its normal position, he has only to depress pedal 47 and again engage the shoulder of the same with the edge of plate 46.

The device just described does not form a part of my present invention, but is described and claimed in my copending application, fenders for railway cars, Serial No. 771,652, filed June 4, 1913.

When it is desired to raise the fender into inoperative position as stated, it is simply necessary to lift the forward edge of the fender, the fender swinging about its pivotal connection 10 as a center and the apron 6 opening at its hinged connection so that the parts occupy the position illustrated in Fig. 2, in which the fender may be temporarily held by means of a loop 49 securing member 12 at the end of the fender to the front of the car. In this position the fender is entirely out of the way so that a number of cars may be stored end to end with their bumpers contacting without interference from the fenders.

It should be understood that my invention it not limited to the exact details of construction described, but that reasonable equivalents of the same are comprised within my invention.

Having described my invention, what I claim as new therein and desire to secure by Letters Patent of the United States is:

1. In a car fender, the combination of a horizontal portion pivotally connected at the rear to the car, and a supporting apron comprising upper and lower side members pivotally connected together, the lower edge of said lower member being pivotally connected to said horizontal portion at a point forward of the rear pivotal support of the same, and the upper edge of said upper member being pivotally secured to the car, and adjustable means for locating the pivotal support of the upper edge of said upper member at different distances from the road-bed, substantially as set forth.

2. In a car fender, the combination of a horizontal portion pivotally connected at the rear to the car, and a supporting apron having engagement at its lower edge with said horizontal portion to support the same, said apron having a horizontal top portion, a bracket secured to the car, having horizontal openings therein at different heights, and means adapted to be inserted in any of said openings to coact with the horizontal top portion of said apron to support the same, substantially as set forth.

3. In a car fender, the combination of a horizontal portion having rearwardly extending arms, members extending rearwardly from said arms and adjustably secured thereto, and arms extending upwardly from said members and adjustably secured thereto, said upwardly extending arms being pivotally secured to the car, and a supporting apron connected to said horizontal portion and to the car, substantially as set forth.

4. In a car fender, the combination of a horizontal portion having rearwardly extending arms, members extending rearwardly from said arms and pivotally connected to the car at their rear ends, said members and arms having serrated engaging surfaces, one of each pair of engaging elements having a longitudinal slot therethrough, bolts extending through said arms, members and slots, and adjustably securing said arms and members together, and a supporting apron connected to said horizontal fender portion and to said car, substantially as set forth.

5. In a car fender, the combination of a horizontal portion having rearwardly extending arms, adjustable means secured to said arms and pivotally connected to the car, being adjustable to vary the forward projection of said fender, a supporting apron pivotally connected to said horizontal portion intermediate the front edge and the rear pivotal support of the same, and means for adjusting the height at which the forward edge of said fender is normally carried, substantially as set forth.

6. In a car fender, the combination of a horizontal portion having rearwardly extending arms, a supporting apron pivoted to the car and pivoted to said horizontal portion forward of said rearwardly extending arms, means for adjusting the vertical position at which said apron supports said horizontal portion, and arms adjustably secured to said rearwardly extending arms and pivoted to said car, and adjustable to vary the height of the rear ends of said rearwardly extending arms, substantially as set forth.

This specification signed and witnessed this 25 day of August, 1914.

C. S. BANGHART.

Witnesses:
W. C. BANKS,
FLORENCE G. TUCKER.

Copies of this patent may be obtained for five cents each, by addressing the "Commissioner of Patents, Washington, D. C."